US012767799B2

(12) United States Patent
Takahashi et al.

(10) Patent No.: US 12,767,799 B2
(45) Date of Patent: Oct. 20, 2026

(54) RESIN COMPOSITION, RESIN-COATING MATERIAL, INSULATED WIRE, VEHICLE WIRE HARNESS, AND METHOD OF PRODUCING INSULATED WIRE TO BE USED IN VEHICLE WIRE HARNESS

(71) Applicants: FURUKAWA ELECTRIC CO., LTD., Tokyo (JP); FURUKAWA AUTOMOTIVE SYSTEMS INC., Shiga (JP)

(72) Inventors: Kenji Takahashi, Tokyo (JP); Hideyuki Osuga, Inukami-gun (JP)

(73) Assignees: FURUKAWA ELECTRIC CO., LTD., Tokyo (JP); FURUKAWA AUTOMOTIVE SYSTEMS INC., Shiga (JP)

( * ) Notice: Subject to any disclaimer, the term of this patent is extended or adjusted under 35 U.S.C. 154(b) by 685 days.

(21) Appl. No.: 18/142,126

(22) Filed: May 2, 2023

(65) Prior Publication Data

US 2023/0272198 A1 Aug. 31, 2023

Related U.S. Application Data

(63) Continuation of application No. PCT/JP2021/042790, filed on Nov. 22, 2021.

(51) Int. Cl.

| | |
|---|---|
| ***C08L 23/0853*** | (2025.01) |
| ***C08L 23/04*** | (2006.01) |
| ***C08L 23/06*** | (2006.01) |
| ***H01B 3/44*** | (2006.01) |

(52) U.S. Cl.

CPC .......... *C08L 23/0853* (2013.01); *H01B 3/446* (2013.01); *C08L 2203/202* (2013.01); *C08L 2205/035* (2013.01)

(58) Field of Classification Search

CPC ........... C08L 23/0853; C08L 2203/202; C08L 23/06; C08L 23/04

See application file for complete search history.

(56) References Cited

U.S. PATENT DOCUMENTS

| | | | |
|---|---|---|---|
| 2017/0365378 | A1 | 12/2017 | Kaga et al. |
| 2020/0079969 | A1 | 3/2020 | Takahashi et al. |

FOREIGN PATENT DOCUMENTS

| | | | |
|---|---|---|---|
| CN | 110770291 | A | 2/2020 |
| CN | 111518332 | A | 8/2020 |
| JP | 2009-288903 | A | 12/2009 |
| JP | 2015-38869 | A | 2/2015 |
| JP | 2015-164114 | A | 9/2015 |
| JP | 2017-111920 | A | 6/2017 |
| JP | 2018-73608 | A | 5/2018 |
| JP | 2018-203949 | A | 12/2018 |
| JP | 2021-147555 | A | 9/2021 |
| JP | 2021-187970 | A | 12/2021 |
| WO | WO 2016/175076 | A1 | 11/2016 |
| WO | WO 2018/074233 | A1 | 4/2018 |
| WO | WO 2019/009294 | A1 | 1/2019 |

OTHER PUBLICATIONS

Chinese Office Action for corresponding Chinese Application No. 202180068895.0, dated Jan. 20, 2025, with English translation.

Chinese Office Action and Search Report for corresponding Chinese Application No. 202180068895.0, dated Jul. 9, 2024, with an English translation.

Japanese Office Action for Japanese Application No. 2023-503126, dated Sep. 9, 2025, with English translation.

Extended European Search Report for European Application No. 21962757.7, dated Jun. 6, 2025.

International Search Report for PCT/JP2021/042790 (PCT/ISA/210) mailed on Feb. 15, 2022.

Written Opinion of the International Searching Authority for PCT/JP2021/042790 (PCT/ISA/237) mailed on Feb. 15, 2022.

*Primary Examiner* — Catherine S Branch

(74) *Attorney, Agent, or Firm* — Birch, Stewart, Kolasch & Birch, LLP

(57) ABSTRACT

A resin composition, including the following components (A) and (B); and at least one kind of the following components (C) and (D):

(A) a low density polyethylene resin;
(B) an ethylene-vinyl acetate copolymer resin;
(C) a thioether compound; and
(D) fluororubber, in which:

a content of the component (A) is 5 to 40 parts by mass and a content of the component (B) is 60 to 95 parts by mass in 100 parts by mass of a total content of the components (A) and (B), a total content of the components (C) and (D) is 0.05 to 1 part by mass with respect to 100 parts by mass of the total content of the components (A) and (B), and a proportion of a vinyl acetate component in the component (B) is 40 mass % or less.

14 Claims, No Drawings

RESIN COMPOSITION, RESIN-COATING MATERIAL, INSULATED WIRE, VEHICLE WIRE HARNESS, AND METHOD OF PRODUCING INSULATED WIRE TO BE USED IN VEHICLE WIRE HARNESS

CROSS-REFERENCE TO RELATED APPLICATIONS

This application is a Continuation of PCT International Application No. PCT/JP2021/042790 filed on Nov. 22, 2021. The above application is hereby expressly incorporated by reference, in its entirety, into the present application.

FIELD OF THE INVENTION

The present invention relates to a resin composition, a resin-coating material, an insulated wire, a vehicle wire harness, and a method of producing an insulated wire to be used in a vehicle wire harness.

BACKGROUND OF THE INVENTION

Insulated wires with flame retardancy are widely used for various kinds of white goods (house appliance) and OA equipment, etc. Further, characteristics such as flame retardancy, heat resistance, flexibility (a flexible property), and mechanical characteristics are also required for the insulated wires to be used in automobiles and the like. In the past, resin compositions for realizing insulated wires with flame retardancy, heat resistance, flexibility (a flexible property), and mechanical characteristics by using them as a coating material for the conductor have been studied and many reports thereon have been published.

As a resin composition included in an insulated wire having such desired characteristics, for example, a resin such as polyethylene or an ethylene-vinyl acetate copolymer is widely used.

For example, Patent Literature 1 describes that a flame retardant wire excellent in all of flame retardancy, water resistance, and oil resistance can be obtained by using, as a coating material for a conductor, a resin composition containing an ethylene-vinyl acetate copolymer having a vinyl acetic acid amount within a specific range, a bromine-based flame retardant, an epoxy-based compound, and antimony trioxide and crosslinking the coating material.

Patent Literature 2 describes a resin composition that, when used as a coating material for a conductor, can obtain an insulated wire having excellent flexibility and having an insulating layer that is excellent in oil resistance and mechanical strength. This resin composition has a density within a specific range, and contains a copolymer of an unsaturated hydrocarbon having 4 or more carbon atoms and ethylene, a copolymer of an acrylic acid ester and ethylene or a copolymer of a methacrylic acid ester and ethylene, a flame retardant, and a crosslinking aid in specific amounts.

Patent Literature 3 describes a non-halogen flame retardant resin composition that is excellent in flame retardancy, heat resistance, cold resistance (low temperature characteristics), oil resistance, and mechanical strength such as tensile mechanical characteristics and abrasion resistance and is to be used for forming an insulating film for an insulated wire in which these properties are balanced at a high level. This resin composition contains, with respect to 100 parts by mass of a polyolefin resin, 100 parts by mass or more and 250 parts by mass or less of a metal hydroxide and 1 mass % or more and 20 mass % or less of a silicone oil having a viscosity at 25° C. of 3,000 mPa·s or less, and the polyolefin resin contains 30 mass % or more and 85 mass % or less of polyethylene having a melting point (Tm) determined with a DSC method of 120° C. or more and 130° C. or less and a density of 0.925 or more and 0.945 or less, 10 mass % or more and 60 mass % or less of an ethylene-vinyl acetate copolymer (EVA), and 5 mass % or more and 30 mass % or less of a maleic anhydride-modified ethylene $\alpha$-olefin-based copolymer having a melting point determined with a DSC method of 60° C. or less.

Patent Literature 4 describes an insulated wire and a cable using a halogen-free flame retardant resin composition having flame retardancy and excellent in oil resistance, fuel resistance, and damage resistance. This halogen-free flame retardant resin composition contains, as a base polymer, 60 to 70 mass % of a linear low density polyethylene, 10 mass % or more of an ethylene-vinyl acetate copolymer having a melt flow rate (MFR) of 100 or more, and 10 to 20 mass % of a maleic acid-modified polyolefin, and further contains a metal hydroxide added in an amount of 150 to 220 parts by mass with respect to 100 parts by mass of the base polymer, and carbon black, wherein an addition ratio of the metal hydroxide and the carbon black to each other (metal hydroxide:carbon black) is 15:1 to 100:1, and the halogen-free flame retardant resin composition is crosslinked.

Patent Literature 5 describes a vehicle-mounted wire/cable having high heat resistance and high flexibility and excellent in mechanical strength, abrasion resistance, and flame retardancy. This vehicle-mounted wire/cable includes, as a coating material, a resin composition obtained by adding two specific antioxidants and a specific bromine-based flame retardant in combination to an ethylene-based copolymer containing an ethylene-ethyl acrylate copolymer.

CITATION LIST

Patent Literatures

Patent Literature 1: JP-A-2017-111920 ("JP-A" means an unexamined published Japanese patent application)
Patent Literature 2: WO 2018/074233 A1
Patent Literature 3: WO 2016/175076 A1
Patent Literature 4: JP-A-2015-038869
Patent Literature 5: JP-A-2015-164114

SUMMARY OF THE INVENTION

Technical Problem

When polyethylene and an ethylene-vinyl acetate copolymer are used in combination as a base resin included in a coating material of a wire, adhesion to a metal is enhanced by increasing the proportion of the ethylene-vinyl acetate copolymer in the base resin because the ethylene-vinyl acetate copolymer contains a vinyl acetate (polar molecule) component introduced into its polymer structure. Therefore, the adhesion to the conductor is improved, and the degree of freedom in handling and processing the insulated wire can be increased.

However, the improvement in adhesion to a metal leads to an increase in abrasion due to contact with a metal die during extrusion, resulting in an increase in friction between the inside of the die and the coating material. As a result, die drool (friction residue) is likely to occur at the die tip. Deposition of die drool (die residue) may impair the appearance (may cause surface roughness) and the productivity (may cause yield deterioration due to a bump, a protrusion, and the like) of a product.

Further, when the adhesion strength between the resin-coating material and the conductor is high, the wire stripping process suffers from irregular draw out of the strand of the conductor or break of the strand, and thus the wire stripping property deteriorates. In contrast, when the adhesion strength between the resin-coating material and the conductor is low, wire stripping is followed by occurrence of a shrink-back phenomenon associated with contraction of the insulator, resulting in exposure of the terminal portion of the conductor, and moisture or the like easily enters the exposed portion, and thus an electrical trouble may be caused.

Meanwhile, the abrasion resistance of a wire can be improved by increasing the proportion of polyethylene in the base resin. However, polyethylene has a high degree of crystallinity, and the higher the density is, the higher the degree of crystallinity is. Therefore, when the proportion of polyethylene in the base resin is increased or a high density polyethylene is used, another low molecular weight component is likely to move to the surface layer portion (bleeding, blooming). As a result, possibility of contamination of the production line is increased.

In view of the above-described situation, the present invention provides a resin composition to be used for forming an insulating film (resin-coating material layer) of an insulated wire and thus capable of enhancing the film-forming property on the periphery of the conductor, making the obtained insulated wire excellent in appearance, and achieving desired excellent characteristics suitable for the insulated wire also in terms of flame retardancy and mechanical characteristics. The present invention further provides a resin-coating material using the resin composition, an insulated wire including an insulating film having the resin-coating material, a vehicle wire harness having the insulated wire, and a method of producing an insulated wire to be used in a vehicle wire harness.

Solution to Problem

The present inventors have found, as a result of their studies to solve the above-described problems, that in a resin composition for an insulating coating material (resin-coating material) in which a low density polyethylene resin and an ethylene-vinyl acetate copolymer are used in combination as a base resin, when at least one kind of a thioether compound and fluororubber is blended in a specific amount, formation of an insulating film by extrusion-coating is less likely to generate a foreign matter such as a resin residue (so-called "die drool") at an extrusion port of an extrusion die, bleeding is suppressed also in a subsequent step to prevent contamination of a production line (guide pulley or the like), and the obtained resin-coating material is also excellent in flame retardancy and mechanical strength. The present inventors further intensively conducted studies based on these findings, and have completed the present invention.

That is, the above-described problems have been solved by the following means.

<1>

A resin composition, containing:

the following components (A) and (B); and at least one kind of the following components (C) and (D):

(A) a low density polyethylene resin;

(B) an ethylene-vinyl acetate copolymer resin;

(C) a thioether compound; and (D) fluororubber, wherein a content of the component (A) is 5 to 40 parts by mass and a content of the component (B) is 60 to 95 parts by mass in 100 parts by mass of a total content of the components (A) and (B), wherein a total content of the components (C) and (D) is 0.05 to 1 part by mass with respect to 100 parts by mass of the total content of the components (A) and (B), and wherein a proportion of a vinyl acetate component in the component (B) is 40 mass % or less.

<2>

The resin composition described in the item <1>, wherein the proportion of the vinyl acetate component in the component (B) is 7 mass % or more.

<3>

The resin composition described in the item <1> or <2>, wherein the content of the component (C) is 0.7 parts by mass or less and the content of the component (D) is 1 part by mass or less with respect to 100 parts by mass of the total content of the components (A) and (B).

<4>

The resin composition described in any one of the items <1> to <3>, wherein the content of the component (A) is more than 20 parts by mass and 40 parts by mass or less and the content of the component (B) is 60 parts by mass or more and less than 80 parts by mass in 100 parts by mass of the total content of the components (A) and (B), and wherein the content of the component (C) is 0.5 parts by mass or less with respect to 100 parts by mass of the total content of the components (A) and (B).

<5>

The resin composition described in any one of the items <1> to <3>, wherein the content of the component (A) is 5 parts by mass or more and 20 parts by mass or less and the content of the component (B) is 80 parts by mass or more and 95 parts by mass or less in 100 parts by mass of the total content of the components (A) and (B), and wherein the total content of the components (C) and (D) is 0.5 to 1 part by mass with respect to 100 parts by mass of the total content of the components (A) and (B).

<6>

The resin composition described in any one of the items <1> to <5>, having a VA value of 15 or more, the VA value calculated with a formula described below:

$$VA\ \text{value}=[\text{content (parts by mass) of component }(B)\text{ in 100 parts by mass of total content of components }(A)\text{ and }(B)]\times[\text{proportion (mass \%) of vinyl acetate component in component }(B)]/100,$$

wherein the total content of the components (C) and (D) is 0.5 to 1 part by mass with respect to 100 parts by mass of the total content of the components (A) and (B).

<7>

The resin composition described in any one of the items <1> to <6>, containing at least one kind of a flame retardant, an antioxidant, a processing aid, and a crosslinking aid other than the components (A) to (D).

<8>

The resin composition described in any one of the items <1> to <7>, to be used in a vehicle wire harness.

<9>

A resin-coating material obtained by crosslinking the resin composition described in any one of the items <1> to <8>.

<10>

An insulated wire, containing an insulating film including the resin-coating material described in the item <9>.

<11>

A vehicle wire harness, including the insulated wire described in the item <10>.

<12>

A method of producing an insulated wire to be used in a vehicle wire harness, the method including a step of extrusion-coating a conductor with the resin composition described in any one of the items <1> to <8> to provide a resin composition layer and irradiating the resin composition layer with an electron beam of 80 to 250 kGy.

In the description of the present invention, any numerical expressions in a style of " . . . to . . . " will be used to indicate a range including the lower and upper limits represented by the numerals given before and after "to", respectively.

Advantageous Effects of Invention

The resin composition of the present invention is to be used for forming an insulating film (resin-coating material layer) of an insulated wire and thus capable of enhancing the film-forming property on the periphery of the conductor, making the obtained insulated wire excellent in appearance, and achieving desired excellent characteristics suitable for the insulated wire also in terms of flame retardancy and mechanical characteristics. The resin-coating material of the present invention is to be used as a constituent material of an insulating film of an insulated wire and thus contributes to improvement in productivity of the insulated wire and makes is possible to obtain an insulated wire that is excellent in appearance and exhibits desired excellent characteristics also in terms of flame retardancy and mechanical characteristics. The vehicle wire harness of the present invention includes an insulated wire including an insulating film including the resin-coating material, and is excellent in productivity, appearance, flame retardancy, and mechanical characteristics. According to the method of producing an insulated wire to be used in a vehicle wire harness of the present invention, an insulated wire can be obtained that has the above-described excellent characteristics or superiority while contamination of a production line (guide pulley or the like) is suppressed.

DESCRIPTION OF EMBODIMENTS

[Resin Composition]

The resin composition of the present invention contains (A) a low density polyethylene resin (also referred to as component (A)), (B) an ethylene-vinyl acetate copolymer resin (also referred to as component (B)), and at least one kind of a thioether compound (C) (also referred to as component (C)) and fluororubber (D) (also referred to as component (D)).

Each of the components (A) to (D) and optional components described below may be used alone, or may be used in combination of two or more kinds.

Hereinafter, the components contained in the resin composition of the present invention will be described.

<(A) Low Density Polyethylene Resin>

The resin composition of the present invention contains (A) a low density polyethylene resin as a resin component included in a base resin. In the present invention, the term "low density polyethylene resin" means a polyethylene resin having a density of 0.929 g/cm$^3$ or less. Examples thereof include "low density polyethylenes (LDPEs)" and "very-low-density polyethylenes (VLDPEs)".

The low density polyethylene resin used in the present invention has a density range of preferably 0.870 to 0.929 g/cm$^3$, and more preferably 0.910 to 0.929 cm$^3$. The density of polyethylene can be determined in accordance with JIS K 7112.

The content of the component (A) contained in the resin composition of the present invention is 5 to 40 parts by mass in 100 parts by mass of the total content of the components (A) and (B). The content of the component (A) is preferably 10 to 35 parts by mass, and more preferably 15 to 30 parts by mass in 100 parts by mass of the total content of the components (A) and (B) from the viewpoint of adjusting the adhesion between the resin-coating material and a conductor to an appropriate level.

When the proportion of the (B) ethylene-vinyl acetate copolymer contained in the resin composition is increased, the flexibility and the flame retardancy of the coating material can be improved. In particular in the field of vehicle use, further improvement in flexibility is required for the coating material from the viewpoints of increasing the current of hybrid vehicles and electric vehicles developed in recent years, ease of wiring, space saving, and the like. Therefore, from the viewpoint of imparting flexibility to the insulated wire obtained by covering the periphery of a conductor with the resin composition, the component (A) is preferably contained in an amount of 5 to 20 parts by mass, and more preferably 5 to 10 parts by mass in 100 parts by mass of the total content of the components (A) and (B). Further, from the viewpoint of imparting abrasion resistance to the insulated wire obtained by covering the periphery of a conductor with the resin composition, the content of the component (A) is preferably 20 to parts by mass, and more preferably 30 to 40 parts by mass.

The component (A) used in the present invention preferably has a melt flow rate (MFR) of 0.1 to 20 g/10 min (load: 2.16 kg, temperature: 190° C.), and more preferably 0.2 to 10 g/10 min.

When the component (A) has a melt flow rate within the above-described preferable range, a load on a kneader or an extruder can be further suppressed at the time of preparing a resin composition and at the time of preparing an insulated wire or a wire harness, and the dispersibility of each component in the resin composition can be further enhanced.

The melt flow rate (MFR) can be measured with a method in accordance with JIS K 7210 using an extrusion plastometer (melt indexer) specified in JIS K 6760 as a test machine.

The component (A) used in the present invention may be, for example, a high pressure radical method (high pressure method) low density polyethylene or a metallocene-catalyzed linear low density polyethylene. Regarding the polyethylene, for example, the description in Japanese Patent Application No. 2016-072380 can be referred to. The component (A) used in the present invention may be a modified polyethylene (for example, an acid-modified polyethylene).

The polyethylene used in the present invention can be synthesized with an ordinarily used method, and a commercially available product can be used. Specific examples of the commercially available product include PETROTHENE 180R, PETROTHENE 170R, and PETROTHENE 173R manufactured by Tosoh Corporation, SUMIKATHENE F218-0, SUMIKATHENE F200, and SUMIKATHENE G401 manufactured by SUMITOMO CHEMICAL COMPANY, LIMITED, NOVATEC LF443, NOVATEC LF280H, and NOVATEC LF448K1 manufactured by Japan Polyethylene Corporation, NUC-9060 and ENGAGE-8100 manufactured by NUC Corporation, and NUCG-5130 manufactured by Dow Elastomer (all trade names).

<(B) Ethylene-Vinyl Acetate Copolymer Resin>

The resin composition of the present invention contains (B) an ethylene-vinyl acetate copolymer resin together with the component (A), as a resin component included in a base resin. The resin composition of the present invention has a content of the component (B) of 60 to 95 parts by mass in 100 parts by mass of the total content of the components (A) and (B). The content of the component (B) is preferably 65 to 90 parts by mass, and more preferably 70 to 85 parts by mass from the viewpoint of improving adhesion between the resin-coating material and a conductor.

In particular from the viewpoint of imparting flexibility to the insulated wire obtained by covering the periphery of a conductor with the resin composition, the content of the component (B) is preferably 80 to 95 parts by mass, and more preferably 90 to 95 parts by mass in 100 parts by mass of the total content of the components (A) and (B). Further, from the viewpoint of imparting abrasion resistance to the insulated wire obtained by covering the periphery of a conductor with the resin composition, the content of the component (B) is preferably 60 to 80 parts by mass, and more preferably 60 to 70 parts by mass.

The polymerization form of the ethylene-vinyl acetate copolymer used in the present invention may be any of block polymerization, random polymerization, and graft polymerization.

In the component (B), the proportion of the content of the vinyl acetate component included in the component (B) is 40 mass % or less. The proportion of the content of the vinyl acetate component is preferably 30 mass % or less, and more preferably 20 mass % or less from the viewpoint of adjusting the adhesion between the resin-coating material and a conductor to an appropriate level. From the same viewpoint as described above, the proportion of the content of the vinyl acetate component is preferably 7 mass % or more, and more preferably 9 mass % or more. When the proportion of the content of the vinyl acetate component is within the above-described range, the resin-coating material prepared using the resin composition of the present invention can acquire sufficient mechanical characteristics such as tensile strength and tensile elongation, and in addition, the flame retardancy of the insulated wire can be further improved.

From the viewpoint of imparting desired adhesion strength between the resin-coating material and a conductor, the VA value calculated with the following formula is preferably 7 to 30, more preferably 8 to 28, and still more preferably 10 to 25, and a VA value of 10 to 20 is also preferable.

$$VA\text{ value}=[\text{content (parts by mass) of component }(B)\text{ in 100 parts by mass of total content of components }(A)\text{ and }(B)]\times[\text{proportion (mass \%) of vinyl acetate component in component }(B)]/100$$

The component (B) used in the present invention preferably has a melt flow rate (MFR) of 0.1 to 10 g/10 min (load: 2.16 kg, temperature: 190° C.), and more preferably 0.5 to 5 g/10 min.

When the component (B) has a melt flow rate within the above-described preferable range, a load on a kneader or an extruder can be further suppressed at the time of preparing a resin composition and at the time of preparing an insulated wire or a wire harness, and the dispersibility of each component in the resin composition can be further enhanced.

The melt flow rate (MFR) can be determined in the same manner as described above.

The ethylene-vinyl acetate copolymer (B) used in the present invention can be synthesized with an ordinarily used method, and a commercially available product may be used. Specific examples of the commercially available product include EVAFLEX V5961, EVAFLEX V5274, and EVAFLEX EV170 (all trade names) manufactured by DuPont-Mitsui Polychemicals Co., Ltd.

The total content of the components (A) and (B) in the resin composition of the present invention is preferably 7 to 80 mass %, more preferably 10 to 75 mass %, and still more preferably 20 to 70 mass % from the viewpoints of improving adhesion between the resin-coating material and a conductor and imparting flexibility and abrasion resistance. The total content of the components (A) and (B) in the resin composition is also preferably 30 to 80 mass %, 40 to 75 parts by mass, or 50 to 75 parts by mass. {0028}

<(C) Thioether Compound and (D) Fluororubber>

The resin composition of the present invention contains a specific amount of at least one kind of (C) a thioether compound and (D) fluororubber. As a result, when the resin composition covers the periphery of a conductor, the adhesion strength between the conductor and the resin-coating material can be controlled, and the film-forming property at the time of covering (at the time of producing a wire) and the workability of the wire after the covering can be enhanced.

In the resin composition of the present invention, the total content of the components (C) and (D) is 0.05 to 1 part by mass with respect to 100 parts by mass of the total content of the components (A) and (B). The total content of the components (C) and (D) is preferably 0.1 to 1.0 part by mass, and can be 0.1 to 0.8 parts by mass or may be 0.1 to 0.5 parts by mass, from the viewpoint of adjusting the adhesion between the resin-coating material and a conductor to an appropriate level.

In the present invention, when the resin composition contains only one of the component (C) or (D), the term "total content of the components (C) and (D)" means the content of the one component contained in the resin composition, and when the resin composition contains both of the components (C) and (D), the term means the sum of the contents of the components (C) and (D). The resin composition of the present invention preferably contains only one of the component (C) or (D).

When the resin composition of the present invention contains the component (C) but no component (D), the content of the component (C) is 0.05 to 1 part by mass with respect to 100 parts by mass of the total content of the components (A) and (B). In this case, the content of the component (C) is preferably 0.1 to 1 part by mass with respect to 100 parts by mass of the total content of the components (A) and (B).

When the resin composition of the present invention contains the component (D) but no component (C), the content of the component (D) is 0.05 to 1 part by mass with respect to 100 parts by mass of the total content of the components (A) and (B). In this case, the content of the component (D) is preferably 0.1 to 1 part by mass with respect to 100 parts by mass of the total content of the components (A) and (B).

((C) Thioether Compound)

The component (C) that can be used in the present invention is not particularly limited as long as it is a compound having a thioether bond, but preferably has a melting point of 60° C. or less. Examples of such a thioether compound include thioether-based antioxidants (antioxidants having a thioether bond) to be used as an antioxidant for a wire coating material. Examples thereof include dilauryl 3,3'-thiodipropionate (melting point: 40 to 42° C.), dimyristyl 3,3'-thiodipropionate (melting point: 48 to 53°

C.), distearyl 3,3'-thiodipropionate (melting point: 65 to 67° C.), and 2,2-bis{[3-(dodecylthio)-1-oxopropoxy]methyl}propane-1,3-diyl bis[3-dodecylthiopropionate] (melting point: 46 to 52° C., another name: bis[3-(dodecylthio)propionic acid]2,2-bis[[3-(dodecylthio)-1-oxopropyloxy]methyl]-1,3-propanediyl). Among them, 2,2-bis{[3-(dodecylthio)-1-oxopropoxy]methyl}propane-1,3-diyl bis[3-dodecylthiopropionate] is preferable from the viewpoints of long-term thermal stability and improvement in extraction resistance.

In the resin composition of the present invention, a commercially available thioether-based antioxidant may be used. Examples of the commercially available product include ADK STAB AO-4125 (trade name, manufactured by ADEKA Corporation).

((D) Fluororubber)

Examples of the component (D) that can be used in the present invention include rubber of a homopolymer or a copolymer having a main chain or a side chain including a fluorine atom. The fluororubber is usually obtained by (co)polymerizing a monomer containing a fluorine atom.

Examples of the component (D) include, but are not particularly limited to, copolymer rubber of perfluoro hydrocarbons such as tetrafluoroethylene and hexafluoropropylene, copolymer rubber of fluorine-containing monomers such as partially fluorinated hydrocarbons (for example, vinylidene fluoride), and copolymer rubber of such a perfluoro hydrocarbon and/or a fluorine-containing monomer and a hydrocarbon such as ethylene and/or propylene.

Specific examples thereof include tetrafluoroethylene-propylene copolymer rubber (FEPM), tetrafluoroethylene-fluorinated (for example, hexafluoro) propylene copolymer rubber, tetrafluoroethylene-perfluorovinylether copolymer rubber (FFKM), and vinylidene fluoride rubber (FKM, for example, vinylidene fluoride-hexafluoropropylene copolymer rubber).

Examples thereof further include copolymer rubber of a perfluoro hydrocarbon and/or a fluorine-containing monomer described above and chloroprene and/or chlorosulfonated polyethylene.

Among the above-described fluororubber, tetrafluoroethylene-propylene copolymer rubber and vinylidene fluoride-hexafluoropropylene copolymer rubber are preferable, and tetrafluoroethylene-propylene copolymer rubber is more preferable.

In the resin composition of the present invention, commercially available fluororubber may be used. Examples of the commercially available product include Viton FreeFlow 10 (Trade name, manufactured by The Chemours Company).

In particular when the content of the component (A) is 5 parts by mass or more and 20 parts by mass or less and the content of the component (B) is 80 parts by mass or more and 95 parts by mass or less in 100 parts by mass of the total content of the components (A) and (B) in the resin composition, the total content of the components (C) and (D) contained in the resin composition is preferably 0.5 to 1 part by mass, and preferably 0.7 to 1 part by mass with respect to 100 parts by mass of the total content of the components (A) and (B) from the viewpoint of suppressing adhesion strength between the resin-coating material including the resin composition and a conductor. In this case, the resin composition preferably contains only one of the component (C) or (D).

When the content of the component (A) is more than 20 parts by mass and 40 parts by mass or less and the content of the component (B) is 60 parts by mass or more and less than 80 parts by mass in 100 parts by mass of the total content of the components (A) and (B) in the resin composition, the content of the component (D) is preferably 1 part by mass or less and more preferably 0.8 parts by mass or less, and is also preferably 0.6 parts by mass or less or 0.5 parts by mass or less with respect to 100 parts by mass of the total content of the components (A) and (B) from the viewpoints of suppressing adhesion strength between the resin-coating material including the resin composition and a conductor and suppressing bleeding and blooming (hereinafter, simply referred to as "bleeding" collectively). In this case, it is also preferable that the resin composition contain no component (C) and contain 0.3 parts by mass or more of the component (D).

When, as described above, the content of the component (A) is more than 20 parts by mass and 40 parts by mass or less and the content of the component (B) is 60 parts by mass or more and less than 80 parts by mass in 100 parts by mass of the total content of the components (A) and (B) in the resin composition, the content of the component (C) is preferably 0.7 parts by mass or less, more preferably 0.5 parts by mass or less, and still more preferably 0.3 parts by mass or less. In this case, it is also preferable that the resin composition contain no component (D) and contain 0.1 parts by mass or more of the component (C).

When the VA value is 15 or more, the total content of the components (C) and (D) contained in the resin composition is preferably 0.5 to 1 part by mass, and more preferably 0.7 to 1 part by mass with respect to 100 parts by mass of the total content of the components (A) and (B) from the viewpoint of suppressing adhesion strength between the resin-coating material including the resin composition and a conductor. In this case, the VA value is preferably 30 or less, and more preferably 28 or less.

<Other Components>

The resin composition of the present invention may contain components other than the above-described components, such as a flame retardant, an antioxidant, a processing aid, and a crosslinking aid described below, as long as an effect of the present invention is not impaired.

<Flame Retardant>

A flame retardant can be contained in the present invention as long as an effect of the present invention is not impaired. Examples of such a flame retardant include bromine-based flame retardants and antimony-based flame retardants. In the present invention, at least one of a bromine-based flame retardant or an antimony-based flame retardant is preferably contained, and both a bromine-based flame retardant and an antimony-based flame retardant are more preferably contained. The mixing ratio between the bromine-based flame retardant and the antimony-based flame retardant in terms of the molar ratio between the bromine element and the antimony element is preferably such that the molar ratio of the amount of bromine to the antimony element contained in the resin composition is within the range of 2 to 5 times. That is, the bromine-based flame retardant is preferably contained so as to have a bromine amount of 2 to 5 times the molar content of the antimony-based flame retardant.

When the resin composition of the present invention contains a flame retardant, the flame retardant is preferably contained in a total amount of 33 to 45 parts by mass with respect to 100 parts by mass of the total content of the components (A) and (B).

(Bromine-Based Flame Retardant)

The bromine-based flame retardant used in the present invention is preferably a bromine-containing compound.

That is, the resin composition of the present invention preferably contains a bromine-containing compound as a flame retardant. Examples of the usable bromine-based flame retardant include organic bromine-containing flame retardants such as a brominated N,N'-ethylene bisphthalimide and its derivative compounds (referred to as “brominated N,N'-ethylene bisphthalimide compounds” collectively), N,N'-bis(bromophenyl)terephthalamide and its derivative compounds (referred to as “N,N'-bis(bromophenyl)terephthalamide compounds” collectively), a brominated bisphenol and its derivative compounds (referred to as “brominated bisphenol compounds” collectively), and a 1,2-bis(bromophenyl) alkane. Among them, for example, a brominated N,N'-ethylene bisphthalimide and/or 1,2-bis(bromophenyl) ethane are preferably used.

By using a brominated N,N'-ethylene bisphthalimide and/or a 1,2-bis(bromophenyl)alkyl, preferably 1,2-bis(bromophenyl)ethane, as a flame retardant, a resin-coating material can be formed in which almost no bleeding occurs.

As the bromine-based flame retardant used in the resin composition of the present invention, a commercially available bromine-based flame retardant may be used. Examples thereof include SAYTEX 8010 (trade name, manufactured by Albemarle Corporation).

When the resin composition of the present invention contains a bromine-based flame retardant, the bromine-based flame retardant is preferably contained in an amount of 15 to 35 parts by mass with respect to 100 parts by mass of the total content of the components (A) and (B).

(Antimony-Based Flame Retardant)

Examples of the antimony-based flame retardant include antimony trioxide, antimony tetraoxide, antimony pentoxide, and sodium antimonate. It is considered that antimony reacts with chlorine (halogen), the generated gas blocks oxygen, and thus formation of a carbonized layer is promoted and free radicals are trapped (function of stopping thermal decomposition chain reaction). Among these, antimony trioxide is preferably contained in the present invention from the viewpoint of forming a further stable carbonized layer.

In the present invention, a commercially available antimony trioxide may be used. Examples of the commercially available product include PATOX-C (trade name, manufactured by Nihon Seiko Co., Ltd.).

When the resin composition of the present invention contains an antimony-based flame retardant, the antimony-based flame retardant is preferably contained in an amount of 5 to 15 parts by mass with respect to 100 parts by mass of the total content of the components (A) and (B).

(Another Flame Retardant)

The resin composition of the present invention may contain a flame retardant that can be usually used in an insulating film of an insulated wire, other than the bromine-based flame retardant and the antimony-based flame retardant. Examples of such a flame retardant include metal hydroxides (hydroxide-based flame retardants) such as magnesium hydroxide and aluminum hydroxide. When the resin composition of the present invention contains a hydroxide-based flame retardant, the content is preferably 5 parts by mass or less, and more preferably 3 parts by mass or less with respect to 100 parts by mass of the total content of the components (A) and (B).

<Antioxidant>

The resin composition of the present invention may contain an antioxidant. Examples of the antioxidant include phenol compounds (phenol-based antioxidants) and imidazole compounds (imidazole-based antioxidants).

When the resin composition of the present invention contains an antioxidant, the antioxidant is preferably contained in a total amount of 2 to 6 parts by mass with respect to 100 parts by mass of the total content of the components (A) and (B).

(Phenol-Based Antioxidant)

Examples of the phenol-based antioxidant usable in the resin composition of the present invention include triethyleneglycol-bis(3-(3-t-butyl-5-methyl-4-hydroxyphenyl)propionate), 1,6-hexanediol-bis(3-(3,5-di-t-butyl-4-hydroxyphenyl)propionate), pentaerythrityl-tetrakis(3-(3,5-di-t-butyl-4-hydroxyphenyl)propionate), octadecyl-3-(3,5-di-t-butyl-4-hydroxyphenyl)propionate, 1,3,5-trimethyl-2,4,6-tris(3,5-di-t-butyl-4-hydroxybenzyl)benzene, tris(3,5-di-t-butyl-4-hydroxybenzyl)isocyanurate, and isooctyl-3-(3,5-di-t-butyl-4-hydroxyphenyl)propionate. Among them, antioxidants having two or more of 3,5-di-t-butyl-4-hydroxyphenyl groups or 3,5-di-t-butyl-4-hydroxybenzyl groups are preferable, and tris-(3,5-di-t-butyl-4-hydroxybenzyl)isocyanurate and pentaerythrityl-tetrakis(3-(3,5-di-t-butyl-4-hydroxyphenyl)propionate) are particularly preferable, from the viewpoint of imparting high heat resistance to a vehicle wire harness.

In the present invention, a commercially available phenol-based antioxidant may be used. Examples of the commercially available product include Irganox 1010 (trade name, manufactured by BASF).

When the resin composition of the present invention contains a phenol-based antioxidant, the phenol-based antioxidant is preferably contained in an amount of 0.5 to 2 parts by mass with respect to 100 parts by mass of the total content of the components (A) and (B).

(Imidazole-Based Antioxidant)

Examples of the imidazole-based antioxidant usable in the resin composition of the present invention include 2-sulfanyl benzimidazole, 2-sulfanyl methylbenzimidazole, 4-sulfanyl methylbenzimidazole, 5-sulfanyl methylbenzimidazole, and zinc salts thereof. Among them, 2-sulfanyl benzimidazole and its zinc salt are preferable.

In the present invention, a commercially available imidazole-based antioxidant may be used. Examples of the commercially available product include NOCRAC MBZ (trade name, manufactured by OUCHI SHINKO CHEMICAL INDUSTRIAL CO., LTD.)

When the resin composition of the present invention contains an imidazole-based antioxidant, the imidazole-based antioxidant is preferably contained in an amount of 1 to 4 parts by mass with respect to 100 parts by mass of the total content of the components (A) and (B).

<Processing Aid>

The resin composition of the present invention also preferably contains a processing aid. Preferred examples of the processing aid include metal soaps (lubricants).

Examples of the metal soap (lubricant) usable in the resin composition of the present invention include calcium stearate, zinc stearate, and magnesium stearate.

In the present invention, a commercially available metal soap may be used. Examples of the commercially available product include SHINACA LEAD ZS-101 (trade name, manufactured by Shinagawa Chemical industries Co., Ltd.).

When the resin composition of the present invention contains a metal soap, the content is preferably 0.5 to 2 parts by mass with respect to 100 parts by mass of the total content of the components (A) and (B).

<Crosslinking Aid>

The resin composition of the present invention also preferably contains a crosslinking aid. Examples of the crosslinking aid include polyfunctional compounds, and compounds having 2 or more (preferably 3 or more, and more preferably 3 to 6) ethylenically unsaturated bonds (carbon-carbon double bonds) in the molecule are preferable.

Specific examples of the crosslinking aid include (meth) acrylate compounds such as polypropylene glycol diacrylate and trimethylolpropane triacrylate, allyl compounds such as triallyl cyanurate, maleimide compounds, and divinyl compounds.

In the present invention, a commercially available crosslinking aid may be used. Examples of the commercially available product include Ogmont T200 (trade name, manufactured by SHIN-NAKAMURA CHEMICAL Co., Ltd.).

The resin composition of the present invention preferably contains 1 to 4 parts by mass of a crosslinking aid with respect to 100 parts by mass of the total content of the components (A) and (B).

<Additive>

In the resin composition of the present invention, various additives, for example, a copper inhibitor, an ultraviolet absorber, a dispersant, a plasticizer, a filler, and a pigment may be appropriately blended as needed as long as an effect of the present invention is not impaired. Examples of such an additive include zinc compounds. Specific examples of the zinc compound include zinc sulfide and zinc oxide.

[Method of Producing of Resin Composition]

The resin composition of the present invention can be obtained by preparing the above-described components (A) to (D), and as needed, the above-described optional components, and melt-mixing the components with an ordinarily used kneading equipment such as a batch-type kneader such as a roll, a kneader, or a Banbury mixer or a twin-screw extruder.

[Insulated Wire]

The insulated wire of the present invention has a layer including a resin-coating material obtained by crosslinking the resin composition of the present invention, on the surface of a conductor (whose examples include a conductor bundle and a fiber core wire). Meanwhile, the insulated wire of the present invention may have an interlayer or a shielding layer between the conductor and the layer including the resin-coating material.

When the insulated wire of the present invention has a cross-sectional area of 2 sq (square, JIS standard) or less, the polyethylene resin of the component (A) is preferably blended in a large amount in the resin composition of the present invention that is a film-forming material, from the viewpoint of imparting abrasion resistance to the insulated wire. Specifically, the content of the component (A) is preferably 20 to 40 parts by mass, and more preferably 30 to 40 parts by mass in 100 parts by mass of the total content of the components (A) and (B) in the resin composition of the present invention. When the content of the component (A) in the base resin is within the above-described range, the adhesion strength between the wire coating material and the conductor is preferably controlled by suppressing the amount of the thioether compound of the component (C) blended and using the fluororubber of the component (D) as a main component, from the viewpoint of suppressing bleeding.

When the insulated wire of the present invention has a cross-sectional area of 3 sq or more, the ethylene-vinyl acetate copolymer of the component (B) is preferably blended in a large amount in the resin composition of the present invention that is a film-forming material, from the viewpoint of imparting flexibility to the insulated wire. Specifically, the content of the component (B) is preferably 80 to 95 parts by mass, and more preferably 90 to 95 parts by mass in 100 parts by mass of the total content of the components (A) and (B) in the resin composition of the present invention.

[Vehicle Wire Harness]

The vehicle wire harness of the present invention includes the insulated wire of the present invention. The resin composition of the present invention is excellent in appearance, and has excellent flame retardancy and mechanical characteristics. Therefore, a wire harness incorporating an insulated wire having a layer including a resin-coating material obtained by crosslinking the resin composition of the present invention can be suitably used for vehicle applications.

Hereinafter, the vehicle wire harness may be referred to simply as "wire harness" in several cases.

[Method of Producing Insulated Wire to be Used in Vehicle Wire Harness]

The insulated wire to be used in a vehicle wire harness of the present invention can be obtained through a step of extrusion-coating a conductor with the resin composition of the present invention to provide a resin composition layer and irradiating the resin composition layer with an electron beam of 80 to 250 kGy. This electron beam irradiation causes a crosslinking reaction in the resin composition layer to form a resin-coating material layer.

The conductor may be a single wire or a stranded wire, and may be a bare wire or a tin-plated or enamel-coated wire. Examples of the conductor-forming metal materials include an annealed copper, a copper alloy, and aluminum. The thickness of the layer including the resin-coating material that is formed on the periphery of the conductor is not particularly limited. However, usually it is about 0.15 to 5 mm.

The diameter and the material of the conductor, the thickness of the coating layer, etc. are not particularly limited, and are appropriately determined according to the purpose or the intended use of the insulated wire. The crosslinking reaction by electron beam irradiation can be carried out with a normal method under normal conditions, and is not limited. The electron beam-irradiation conditions are preferably 50 to 450 kGy, more preferably 80 to 250 kGy, still more preferably 80 to 200 kGy, and particularly preferably 80 to 160 kGy, in terms of irradiance level. The accelerating voltage is preferably 300 to 3,000 keV, and more preferably 500 to 2,500 keV.

Further, a multilayer structure may be formed by providing, for example, an interlayer or a shielding layer between a conductor and a coating layer or between coating layers.

The conditions for extrusion-forming the resin composition of the present invention are not particularly limited, as long as the resin composition of the present invention can be extruded. However, from the points that a load on an extruder (extrusion machine) can be lowered and a shape retaining property can be secured, the extruding temperature (head part) is preferably 100 to 230° C., and more preferably 120 to 200° C.

Other conditions for the extrusion forming can be appropriately set according to the purpose.

The screw configuration of the extruder is not particularly limited, and an ordinarily used full flight screw, double flight screw, tip-double flight screw, maddock screw, and the like may be used.

Any conductor may be used as long as the conductor has a shape and a material (copper, aluminum, or the like) that are generally used in an insulated wire to be used in a vehicle wire harness.

Further, the thickness of the resin coating layer is not particularly limited. When the resin composition of the present invention is used, even if the thickness of the resin coating layer is thin, there is an advantage that an insulated wire can be obtained that is excellent in flexibility, hardness, degree of cross-linkage, flame retardancy, cold resistance, and heat resistance.

EXAMPLES

The present invention will be described in more detail based on the following Examples and Comparative Examples, but the present invention is not limited thereto.

Examples 1 to 8 and Comparative Examples 1 to 9

Tables 1 and 2 below show the materials for preparation of the resin compositions of Examples 1 to 8 and Comparative Examples 1 to 9. Details of the materials used are as follows. Note that the following items (1) to (18) correspond to the items (1) to (18) in Tables 1 and 2 below.

<Used Materials>

(Component (A): Polyethylene (PE) Resin)

(1): NUC-9060 (trade name), manufactured by NUC Corporation, density: 0.923 g/cm$^3$ (2): NUCG-5130 (trade name), manufactured by Dow Elastomer, density: 0.923 g/cm$^3$ (3): ENGAGE-8100 (trade name), manufactured by NUC Corporation, density: 0.870 g/cm$^3$ (4): HI-ZEX-5305E (trade name), manufactured by Prime Polymer Co., Ltd., density: 0.950 g/cm$^3$ (5): ADTEX L6100M (trade name), manufactured by Japan Polyolefins Co., Ltd., density: 0.920 g/cm$^3$, maleic acid-modified (Component (B): Vinyl Acetate Copolymer Resin)

(6): EVAFLEX V5961 (trade name), manufactured by DuPont-Mitsui Polychemicals Co., Ltd., content of vinyl acetate component: 9 mass %

(7): EVAFLEX V5274 (trade name), manufactured by DuPont-Mitsui Polychemicals Co., Ltd., content of vinyl acetate component: 17 mass %

(8): EVAFLEX EV170 (trade name), manufactured by DuPont-Mitsui Polychemicals Co., Ltd., content of vinyl acetate component: 33 mass %

(9): EVAFLEX EV40LX (trade name), manufactured by DuPont-Mitsui Polychemicals Co., Ltd., content of vinyl acetate component: 41 mass %

(10): EVAFLEX EV45LX (trade name), manufactured by DuPont-Mitsui Polychemicals Co., Ltd., content of vinyl acetate component: 46 mass %

(Component (C): Thioether Compound)

(11): 2,2-Bis{[3-(dodecylthio)-1-oxopropoxy]methyl}propane-1,3-diyl bis[3-dodecylthiopropionate], ADK STAB AO-4125 (trade name), manufactured by ADEKA Corporation (Component (D): Fluororubber)

(12): Viton FreeFlow 10 (trade name), manufactured by The Chemours Company (Flame Retardant)

(13): 1,2-Bis(pentabromophenyl)ethane, SAYTEX 8010 (trade name), manufactured by Albemarle Corporation (14): Antimony trioxide, PATOX-C (trade name), manufactured by Nihon Seiko Co., Ltd.

(Antioxidant)

(15): Pentaerythrityl-tetrakis(3-(3,5-di-t-butyl-4-hydroxyphenyl)propionate), phenol-based antioxidant, Irganox 1010 (trade name), manufactured by BASF (16): Imidazole-based antioxidant, zinc salt of 2-sulfanyl benzimidazole, NOCRAC MBZ (trade name), manufactured by OUCHI SHINKO CHEMICAL INDUSTRIAL CO., LTD.

(Processing Aid)

(17): Zinc distearate, SHINACA LEAD ZS-101 (trade name), manufactured by Shinagawa Chemical industries Co., Ltd.

(Crosslinking Aid)

(18): Trimethylolpropane trimethacrylate, Ogmont T200 (trade name), manufactured by SHIN-NAKAMURA CHEMICAL Co., Ltd.

<Production of Resin Composition Pellet>

Components in accordance with the compositions shown in Tables 1 and 2 below were melt-mixed at 180° C. using a 1.7 L-Banbury mixer, and the mixture was ejected and pelletized through an extruder to obtain resin composition pellets of Examples 1 to 8 and Comparative Examples 1 to 9.

<Production of Insulated Wire>

Each resin composition pellet obtained above was used for extrusion-coating of a conductor using an extruder set at a temperature of 130 to 190° C. The formed resin composition layer was subjected to a crosslinking reaction by electron beam irradiation. Thus, an insulated wire was obtained that had a cross-sectional area of 3 mm$^2$ (≃3 sq) and had an insulating film with a thickness of 0.7 mm around a conductor made of copper having a circular cross section.

The crosslinking using an electron beam was conducted at an accelerating voltage of 800 keV under the condition of 160 kGy.

[Performance Evaluation]

The following performance evaluation was performed using each insulated wire produced as described above.

<Surface Smoothness>

The surface smoothness (extrusion appearance) of each insulated wire was measured as follows.

Using a laser microscope (LASER MICROSCOPE VK-X250, manufactured by KEYENCE CORPORATION), the surface of each insulated wire was measured along the length direction under the conditions of a stylus point radius of 2 μm and a static measuring force at the stylus average position of 0.75 mN. Each insulated wire was measured three times (N=3), and the average of the obtained values was taken as the arithmetic average roughness Ra (μm). The calculated arithmetic average roughness Ra was evaluated in accordance with the following criteria. Those satisfying the evaluation criteria A and B were regarded as acceptable.

—Evaluation Criteria—

A: Ra was less than 2 μm.

B: Ra was 2 μm or more and less than 3 μm.

C: Ra was 3 μm or more.

<Extrusion Workability>

When extrusion forming was performed on the conductor fora length of 5,000 m under the above-described conditions, the resin residue (die residue, die drool) deposited on the extrusion port and the resin residue adhering to the insulated wire were evaluated in accordance with the following criteria. Those satisfying the evaluation criteria A and B were regarded as acceptable. In the insulated wire obtained by the extrusion forming, the adhering resin residue was sequentially removed with an air gun. The used air gun (trade name: AG45, manufactured by Kurita Seisakusho Corp) had a tip diameter of φ2.0 and an air pressure of 0.5 MPa.

—Evaluation Criteria—

A: When an insulated wire with a length of 5,000 m was produced, no resin residue was deposited on and no resin residue was adhered to the extrusion port and the insulated wire.

B: When an insulated wire with a length of 5,000 m was produced, a resin residue was deposited on the extrusion port, but no resin residue adhering to the insulated wire was observed after spraying by the air gun.

C: When an insulated wire with a length of 5,000 m was produced, a resin residue was deposited on the extrusion port, and a resin residue adhering to the insulated wire was observed after spraying by the air gun.

<Bleeding>

An insulated wire precursor (before electron beam irradiation) (length: 200 mm) obtained by extrusion-coating with a resin composition was kept at 40° C. for 1 hour. A SUS 304 round rod (φ20×300 mm, hereinafter also referred to as "SUS rod") in a positional relation, with respect to the longitudinal direction of the insulated wire precursor, of being perpendicular to each other was reciprocated times (1 reciprocation: 200 mm×2 times) in the longitudinal direction of the insulated wire precursor so as to be in contact with the surface of the insulated wire precursor (the surface of the layer of the resin composition), and the amount of a matter derived from each insulated wire and adhered to the SUS 304 round rod (adhesion of the surface bleed component of the insulated wire) was evaluated. The adhesion of the bleed component was visually observed, and those satisfying the evaluation criteria A and B were regarded as acceptable.

—Evaluation Criteria—

A: No adhesion of the bleed component was observed.

B: The area in which the bleed component was adhered was less than a half of the area in which the insulated wire precursor and the SUS rod were in contact.

C: The area in which the bleed component was adhered was a half or more of the area in which the insulated wire precursor and the SUS rod were in contact.

<Adhesion Strength>

The adhesion strength between the insulating coating layer and the conductor was measured with a method in accordance with JASO D618 from Japanese Automotive Standards Organization.

In the insulated wire with a length of 75 mm, the insulating coating layer was removed by 25 mm from the tip of the insulation wire to expose the conductor, the conductor was pulled at a tension rate set to 250 mm/min at room temperature (23° C.), and at this time, the maximum tensile strength until the resin coating layer fell off the conductor was measured. The measurement results were evaluated in accordance with the following criteria. Those satisfying the evaluation criteria A and B were regarded as acceptable.

—Evaluation Criteria—

A: The maximum tensile strength was 10 N or more and less than 40 N.

B: The maximum tensile strength was 40 N or more and less than 80 N.

C1: The maximum tensile strength was less than 10 N.

C2: The maximum tensile strength was 80 N or more.

<Flame Retardancy>

An inclining combustion test was performed in accordance with the International Organization for Standardization (ISO) 19642. A wire sample with a length of 600 mm was cut out from each insulated wire, and the prepared sample was supported in a state of being inclined by about 45 degrees with respect to the horizontal. Using a Bunsen burner having a diameter of 10 mm, the end of a reducing flame with a length of 50 mm was brought into contact with the sample at a site located 500±5 mm from the upper end of the sample for 30 seconds or until the conductor was exposed, and the flame was gently removed. Thereafter, the flame-remaining time until the flame went out was measured, and evaluated in accordance with the following criteria. Those satisfying the evaluation criteria A and B were regarded as acceptable.

—Evaluation Criteria—

A: The flame-remaining time was less than 5 seconds.

B: The flame-remaining time was 5 seconds or more and less than 30 seconds.

C: The flame-remaining time was 30 seconds or more.

<Tensile Properties>

The coating material of the insulated wire was collected and evaluated in accordance with the following criteria in conformity of Japanese Industrial Standards (JIS) K 7161.

From each insulated wire, the conductor was removed to prepare a tubular sample, and the tensile strength (breaking strength, MPa) and the breaking elongation (%) were measured at a gripping distance of 60 mm, a gauge length of 20 mm, and a tension rate of 200 mm/min (room temperature, 23° C.). The term "breaking elongation (%)" refers to a percentage value of an increase in gauge length at the time of sample breakage with respect to the initial gauge length. Therefore, a breaking elongation of 100% means a doubled gauge length. The measured tensile strength and breaking elongation were evaluated in accordance with the following evaluation criteria. Those satisfying the evaluation criteria A and B were regarded as acceptable.

—Evaluation Criteria—

A: The tensile strength was 20 MPa or more and the breaking elongation was 400% or more.

B: The tensile strength was 15 MPa or more and less than 20 MPa and/or the breaking elongation was 300% or more and less than 400%.

C: The tensile strength was less than 15 MPa and/or the breaking elongation was less than 300%.

Tables 1 and 2 show the obtained results collectively. The unit of the amount of each component blended described in the following tables is parts by mass (mass ratio).

TABLE 1

| | | Ex. 1 | Ex. 2 | Ex. 3 | Ex. 4 | Ex. 5 | Ex. 6 | Ex. 7 | Ex. 8 |
|---|---|---|---|---|---|---|---|---|---|
| PE resin | (1) Density: 0.923 g/cm$^3$ | | | | 20 | 40 | 30 | | |
| | (2) Density: 0.923 g/cm$^3$ | 5 | 10 | | | | | 40 | 30 |
| | (3) Density: 0.870 g/cm$^3$ | | | 10 | | | | | |
| EVA resin | (6) VA 9% | | | 90 | | | | | |
| | (7) VA 17% | 95 | 90 | | | 60 | 70 | | |
| | (8) VA 33% | | | | 80 | | | 60 | 70 |
| | VA value | 16.15 | 15.3 | 8.1 | 26.4 | 10.2 | 11.9 | 19.8 | 23.1 |

TABLE 1-continued

| | | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Thioether compound | (11) Thioether compound | 0.7 | — | — | 1 | 0.1 | — | 0.5 | — |
| Fluororubber | (12) Fluororubber | — | 1 | 0.1 | — | — | 0.4 | — | 0.8 |
| Flame retardant | (13) Bromine-based | 30 | 30 | 30 | 30 | 30 | 30 | 30 | 30 |
| | (14) Antimony-based | 10 | 10 | 10 | 10 | 10 | 10 | 10 | 10 |
| Antioxidant | (15) Phenol-based | 1 | 1 | 1 | 1 | 1 | 1 | 1 | 1 |
| | (16) Imidazole-based | 2 | 2 | 2 | 2 | 2 | 2 | 2 | 2 |
| Processing aid | (17) Metal soap (lubricant) | 0.5 | 1 | 0.5 | 0.5 | 0.5 | 0.5 | 1 | 0.5 |
| Crosslinking aid | (18) Polyfunctional monomer | 2 | 3 | 3 | 3 | 2 | 3 | 3 | 3 |
| Surface smoothness | | B | B | A | B | A | A | A | A |
| Extrusion workability | | B | A | A | B | A | A | A | A |
| Bleeding adhesion | | A | A | B | A | A | B | B | A |
| Adhesion strength | | A | A | A | A | B | A | A | A |
| Flame retardancy | | A | A | B | A | B | B | B | B |
| Tensile properties | | A | A | A | B | A | A | A | B |

Remarks: 'Ex.' means Example according to this invention.

TABLE 2

| | | CEx. 1 | CEx. 2 | CEx. 3 | CEx. 4 | CEx. 5 | CEx. 6 | CEx. 7 | CEx. 8 | CEx. 9 |
|---|---|---|---|---|---|---|---|---|---|---|
| PE resin | (1) Density: 0.923 g/cm$^3$ | | 10 | | | | 50 | | | |
| | (2) Density: 0.923 g/cm$^3$ | | | | | 80 | | 10 | | |
| | (3) Density: 0.870 g/cm$^3$ | | | | | | 20 | | | |
| | (4) Density: 0.950 g/cm$^3$ | | | 30 | 100 | | | | | 30 |
| Maleic acid-modified PE resin | (5) Density: 0.920 g/cm$^3$ | | | | | | | | 30 | |
| EVA resin | (8) VA 33% | | | | | 20 | | | | |
| | (9) VA 41% | 100 | 90 | | | | | | 70 | |
| | (10) VA 46% | | | 70 | | | 30 | 90 | | 70 |
| | VA value | 41 | 36.9 | 32.2 | 0 | 6.6 | 13.8 | 41.4 | 28.7 | 32.2 |
| Thioether compound | (11) Thioether compound | 1 | 3 | 0.5 | 1.3 | 2 | 1.5 | 0.3 | 1.5 | — |
| Fluororubber | (12) Fluororubber | — | — | 0.7 | — | — | — | — | — | — |
| Flame retardant | (13) Bromine-based | 30 | 30 | 30 | 30 | 30 | 30 | 30 | 30 | 30 |
| | (14) Antimony-based | 10 | 10 | 10 | 10 | 10 | 10 | 10 | 10 | 10 |
| Antioxidant | (15) Phenol-based | 1 | 1 | 1 | 1 | 1 | 1 | 1 | 1 | 1 |
| | (16) Imidazole-based | 2 | 2 | 2 | 2 | 2 | 2 | 2 | 2 | 2 |
| Processing aid | (17) Metal soap (lubricant) | 1 | 0.5 | 0.5 | 0.5 | 0.5 | 1 | 0.5 | 0.5 | 0.5 |
| Crosslinking aid | (18) Polyfunctional monomer | 3 | 3 | 6 | 3 | 3 | 3 | 4 | 3 | 3 |
| Surface smoothness | | C | C | C | A | A | B | C | C | C |
| Extrusion workability | | C | C | B | A | B | B | C | C | C |
| Bleeding adhesion | | A | C | C | C | C | C | A | C | A |
| Adhesion strength | | C2 | C1 | B | C1 | C1 | C1 | C2 | C2 | C2 |
| Flame retardancy | | A | A | B | C | C | C | A | C | A |
| Tensile properties | | C | C | C | C | B | B | C | A | C |

Remarks: 'CEx.' means Comparative Example according to this invention.

<Notes in Tables>

The content of each component in Tables is based on a mass part. A blank and the expression "-" mean that the corresponding component is not included.

From the results in Table 2, in the insulated wires using resin compositions that do not satisfy the definitions of the present invention, at least three evaluation items were the unacceptable level.

In contrast, it is apparent from the results in Table 1 that evaluation items about the insulated wires prepared using the resin composition of the present invention were all acceptable level. From the above, it can be seen that the resin composition of the present invention can be suitably used as a resin-coating material layer of an insulated wire.

Having described our invention as related to the present embodiments, it is our intention that the invention not be limited by any of the details of the description, unless otherwise specified, but rather be construed broadly within its spirit and scope as set out in the accompanying claims.

The invention claimed is:

1. An insulating resin composition, comprising:

the following components (A) and (B); and at least one of the following components (C) and (D):

(A) a low density polyethylene resin;

(B) an ethylene-vinyl acetate copolymer resin;

(C) a thioether compound; and (D) fluororubber, wherein a content of the component (A) is 5 to 40 parts by mass and a content of the component (B) is 60 to 95 parts by mass in 100 parts by mass of a total content of the components (A) and (B), wherein a total content of the components (C) and (D) is 0.05 to 1 part by mass with respect to 100 parts by mass of the total content of the components (A) and (B), and wherein a proportion of a vinyl acetate component in the component (B) is 40 mass % or less.

2. The insulating resin composition according to claim 1, wherein the proportion of the vinyl acetate component in the component (B) is 7 mass % or more.

3. The insulating resin composition according to claim 1, wherein a content of the component (C) is 0.7 parts by mass or less and a content of the component (D) is 1 part by mass or less with respect to 100 parts by mass of the total content of the components (A) and (B).

4. The insulating resin composition according to claim 1, wherein the content of the component (A) is more than 20 parts by mass and 40 parts by mass or less and the content of the component (B) is 60 parts by mass or more and less than 80 parts by mass in 100 parts by mass of the total content of the components (A) and (B), and wherein a content of the component (C) is 0.5 parts by mass or less with respect to 100 parts by mass of the total content of the components (A) and (B).

5. The insulating resin composition according to claim 1, wherein the content of the component (A) is 5 parts by mass or more and 20 parts by mass or less and the content of the component (B) is 80 parts by mass or more and 95 parts by mass or less in 100 parts by mass of the total content of the components (A) and (B), and wherein the total content of the components (C) and (D) is 0.5 to 1 part by mass with respect to 100 parts by mass of the total content of the components (A) and (B).

6. The insulating resin composition according to claim 1, having a VA value of 15 or more, the VA value calculated with a formula described below:

*VA* value=[content (parts by mass) of component (*B*) in 100 parts by mass of total content of components (*A*) and (*B*)]×[proportion (mass %) of vinyl acetate component in component (*B*)]/100 wherein the total content of the components (C) and (D) is 0.5 to 1 part by mass with respect to 100 parts by mass of the total content of the components (A) and (B).

7. The insulating resin composition according to claim 1, comprising one or more of a flame retardant, an antioxidant, a processing aid, and a crosslinking aid other than the components (A) to (D).

8. A vehicle wire harness comprising the insulating resin composition according to claim 1.

9. A resin-coating material obtained by crosslinking the insulating resin composition according to claim 1.

10. An insulated wire, comprising an insulating film including the resin-coating material according to claim 9.

11. A vehicle wire harness, comprising the insulated wire according to claim 10.

12. A method of producing an insulated wire to be used in a vehicle wire harness, the method comprising a step of extrusion-coating a conductor with the insulating resin composition according to claim 1 to provide a resin composition layer and irradiating the resin composition layer with an electron beam of 80 to 250 kGy.

13. The insulating resin composition according to claim 1, wherein a melting point of component (C) is 60° C. or less.

14. The insulating resin composition according to claim 1, wherein a content of the component (C) is 0.1 to 0.8 parts by mass with respect to 100 parts by mass of the total content of the components (A) and (B).

* * * * *